Nov. 11, 1969  F. E. RANDALL  3,478,135
MOLDING METHOD AND MEANS AND STRUCTURES PRODUCED THEREBY
Filed May 5, 1966
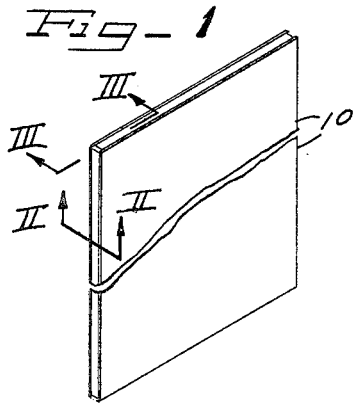
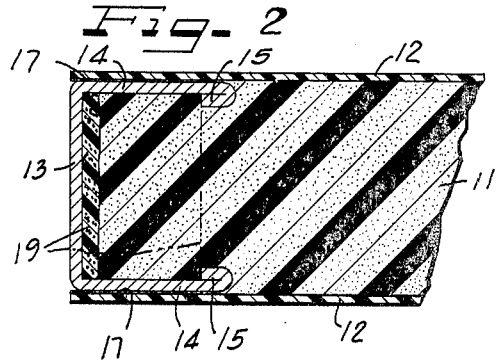
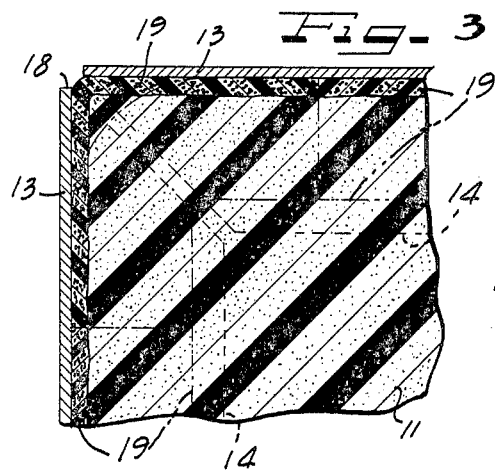
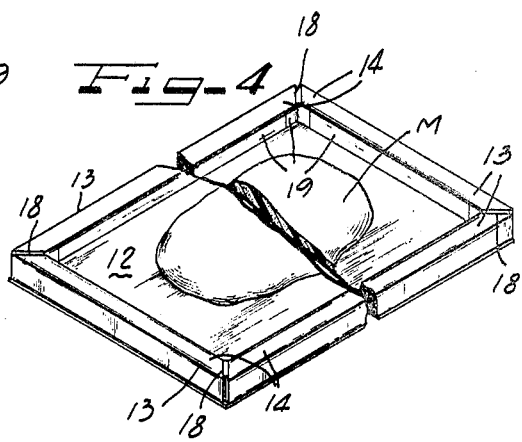
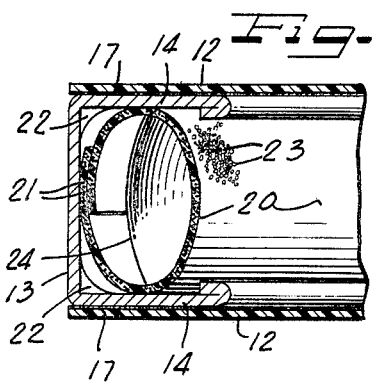
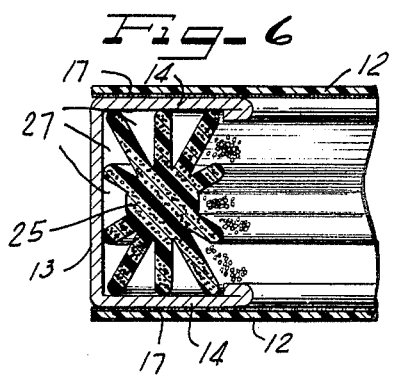
INVENTOR.
FRANK E. RANDALL
BY  ATTORNEYS "# United States Patent Office 3,478,135
Patented Nov. 11, 1969

3,478,135
MOLDING METHOD AND MEANS AND
STRUCTURES PRODUCED THEREBY
Frank E. Randall, 5610 Woodland Court,
Peoria, Ill. 61614
Filed May 5, 1966, Ser. No. 547,952
Int. Cl. B29h 7/20; B29f 3/03
U.S. Cl. 264—45                                    4 Claims

ABSTRACT OF THE DISCLOSURE

A method of molding within a closed cavity, and a structure, wherein a member having air passages is placed along a wall within the cavity and thereby provides an air escape route to a vent, the cavity is filled with a moldable material mass which displaces the air from the cavity by way of the member and moves into engagement with the member. The passageway-providing member extends as a barrier across the vent to which the passages lead. The air displacement member is desirably porous and collapsible. Especially suitable for a panel in which the cavity is defined by a pair of spaced facing sheets and edging strips bonded to the margins of the facing sheets and the moldable material comprises a lightweight polyurethane foam core which thrusts the passageway member into collaped condition against the wall.

---

This invention relates to a molding method and more particularly concerns the efficient displacement of air from closed molding cavities, with elimination of trapped air pockets in the structures and otherwise improving the structures.

In molding certain materials, a major problem resides in the evacuation of air displaced as the moldable material expands or otherwise fills the cavity. Certain materials, and especially those which are viscous during the cavity-filling phase, may tend to spread unevenly and to trap pockets of air due to blockages in the intended air displacement or evacuation escape route or routes. Merely locating vent holes at numerous points is not satisfactory because the material may itself escape as by extruding through such holes, with consequent loss of material and possibly also internal damage to the molded mass.

For example, in the molding of foam material in closed cavities volumetric tolerance has been necessarily quite close in order to avoid undesirable and often damaging pressure buildup within the cavity due to excess amount of foam material, or incomplete filling of the cavity and imperfect molded shape where inadequate quantity of material is supplied to the mold.

It is, accordingly, an important object of the present invention to overcome the foregoing and other problems and disadvantages heretofore encountered, and to provide a novel method of molding, such as to produce rigid foam resin plastic masses, free from entrapped air pockets and of uniform texture and form.

Another object of the invention, is to provide structures including molded masses which are free from trapped air pockets although molded in closed molding cavities and without the loss or extrusion of material through vent holes.

A further object of the invention is to provide a novel method of venting displaced or evacuated air from molding cavities.

A yet further object of the invention is to provide a novel method of evacuating molding cavities, cushioning the molding material during molding, and affording shock resistant and cushioning boundary layer for the molded mass.

These and other objects, features and advantages of the present invention will be readily apparent from the following detailed description of a preferred embodiment thereof, taken in conjunction with the accompanying drawing, in which:

FIGURE 1 is a fragmental view of a structure produced according to the present invention;

FIGURE 2 is an enlarged fragmentary sectional detail view taken substantially on the line II—II of FIGURE 1;

FIGURE 3 is an enlarged fragmentary detail sectional view taken substantially on the line III—III of FIGURE 1;

FIGURE 4 is a fragmental illustrative view disclosing a step in the molding process according to the present invention as applied in the production of the structure of FIGURE 1;

FIGURE 5 is a sectional view similar to FIGURE 2 but showing a modification; and FIGURE 6 is a similar sectional view showing another modification.

According to the present invention, I have provided a method of molding within a closed cavity, which comprises placing an air passage member along a wall within the cavity and defining an air escape route to a vent, filling the cavity with a moldable material mass, displacing the air from the cavity through the air passage member, and moving the material mass into engagement with the passage member.

By the present invention there is provided a structure including a closed cavity adapted for filling with a moldable material mass. A wall defining the cavity has a vent through which air is adapted to be displaced as the material fills the cavity, and an air passage member is mounted along the wall within the cavity in communication with and providing an air escape route to the vent. Such air passage member is positioned to be engaged by the material mass which fills the cavity.

As a practical example of a structure embodying the present invention, a panel 10 is depicted in FIGURE 1. This panel may be of a type useful in foldable closures, doors, partitions, and the like. It comprises as a principal component a panel core 11 constructed as a substantially rigid molded mass. Enclosing the core 11 are respective opposite facing sheets 12 and edging strips 13. While the facing sheets 12 may comprise suitable solid plastic resin material, the edging strips 13 may comprise sheet metal members. Each of the edging strips 13 is of generally channel shape having a pair of spaced coextensive parallel side flanges 14 provided with turned respective reinforcing terminal edges 15. The respective facing sheets 12 are secured to the outer faces of the flanges 14 by means of suitable adhesive 17, substantially as shown in FIGURE 2.

For lightweight, freedom from warpage, low cost and other inherent advantages, the panel core 11 desirably comprises a rigid plastic resin foam mass molded in situ within the shell defined by the facing sheets 12 and the edging strips 13 combining to define a molding cavity. Polyurethane foam of the so-called rigid type has been found excellent for the purpose. The material is relatively easy to handle and to control, foams and sets up rapidly at low curing temperature and has excellent adhesion characteristics so that in the final product the structure affords a functionally integral unitary article with the core 11 adhered to the facing sheets 12 and the edging strips 13.

In making the panel 10, the edging strips 13 are assembled with and adhesively secured to the respective margins of one of the facing sheets 12 to provide an upwardly opening cavity therein, substantially as shown in FIGURE 4. A predetermined mass M of the uncured viscous polyurethane material is placed as nearly as practicable centrally within the open topped cavity. Any pre-"

ferred polyurethane foam system may be used. Several such systems are known and are generally provided by the manufacturer to the ultimate user as a two-part system commonly designated as an A part or prepolymer and a B part or resin component. These parts of the system are metered in predetermined ratio into a mixing head or chamber where they are thoroughly mixed together and the mixture discharged through a nozzle. An exothermic reaction then takes place during which small bubbles are generated by a foaming agent and the viscous mass expands and spreads as it grows within the molding cavity. This stage in the molding of the polyurethane foam material is sometimes referred to as the cream stage. At the end of the foaming or cream stage, the mass gels and then cures to the desired hardness. During the cream stage the mass is adhesive and readily adheres to the surfaces with which it comes in contact.

In order to mold the mass M within the confines of the desired panel shape, immediately after the mass M is deposited within the open topped shell, the remaining facing sheet 12 is secured to the edging strips 13 to close the molding cavity within the shell thus produced. Thereby the mass M of molding material is confined to move outwardly toward the edges of the panel shell as the foaming progresses. As the mass M grows within the cavity the air within the cavity must be correspondingly displaced. This should be substantially uniformly in all directions within the cavity and without back pressure at any point, so as to attain not only uniform filling of the cavity but uniformity of closed cell, foam texture within the expanding mass. Inasmuch as the facing sheets 12 and the edging strips 13 are imperforate and thus airtight, and the adhesive bond 17 between the facing sheets and the edging strip flanges 14 is of a nature to prevent leakage of the viscous foaming material thereby, and the closed cavity shell assembly is mounted in a suitable jig or fixture (not shown) which assures confinement to the desired panel shape without bulging or other distortion or separation of the bonded margins of the facing sheets 12 from the flanges 14, displacement of air is limited to respective vents 18 afforded by narrow gaps between the mitred ends of the edging strips 13.

In order to avoid formation of air pockets between the mass M and the edging strips 13 as the mass spreads theretoward and therealong, and then to prevent extrusion of any part of the mass when it reaches the vents 18, I mount air passage means comprising one or more members 19 along the walls of the cavity defined by the edging strips 13. In a desirable form sponge material is used to provide the member or members 19. Preferably the sponge material comprises any suitable open cell plastic resin such as has from 80% to 99% open cells and which while it may be of a pressure sustaining solid type, is desirably of a collapsibly yieldable type. Initially the sponge members 19 comprise preformed strips which are mounted to line and substantially fill the channels within the edging strips 13, being retained therein by the return bent terminal flanges 15 serving as retainers, substantially as shown in dot dash outline in FIGURES 2 and 3. By having the quantity of material in the mass M predetermined to afford a setup foam core body of a greater volume than the cavity volume minus the air bleedoff passage members 19 in their expanded condition, as the expanding mass M reaches its final stages of expansion, wherein most of the air will have been expelled through the open cell bleed passage air escape routes afforded by the members 19 by the displacing volume of the expanding mass, continuing expansion of the mass presses and collapses the members 19 to substantial density by pressure of the mass toward the confining cavity wall afforded by the strips 13. Throughout this collapsing however, sufficient porosity in the members 19 prevails to assure escape of all air displaced by the expanding mass through the escape routes to the vents 18. Further, by having the air passage members 19 extending across the vents 18, extrusion of the material of the mass M is blocked.

By virtue of collapsibility of the air escape passage members 19, they serve as pressure safety cushions avoiding damaging pressure buildup at any point within the cavity. Additionally, after the core 11 has set and hardened, the compressed members 19 afford cushioning buffer between the edge of the core 11 and the web flanges of the edging strips 13.

In another form, the air passage member may comprise a split expansile tube 20 (FIG. 5) normally tending to expand to a larger diameter than the space between the edging strip flanges 14. An unbroken surface of the tube 20 is presented to the interior of the molding cavity while overlapping margins 21 along the longitudinal split in the tube are disposed in overlapping relation within the root of the edging strip along which extends the air escape route for air displaced from the cavity as the moldable plastic material mass expands against and collapses the tube outwardly toward and against the web flange of the edging strip 13. Displacement of air from the cavity occurs easily past the tube 20 between it and the flanges 14 into escape passages 22 defined between the tube and the re-entrant corners between the flanges 14 and the web of the strip 13. While as the tube collapses under thrust of the expanding core mass it remains close to the flanges 14, binding is avoided because the overlapping flanges 21 are free to slip relatively and afford yielding relief. Air from within the hollow chamber defined by the tube 20 can escape freely from between the overlapping margins 21. If preferred, the tube 20 may be made from porous material so that air displaced from the cavity may escape through a multitude of passages 23 extending through the tube wall. Thin solid plastic tubing or sheet material rolled into tubular form may also be used. Installation of the air passage tube 20 before molding is easily effected by frictionally inserting it into position within the channels of the edging strips 13, and either mitering the tube at the corners or folding it as indicated at 24, whereby a barrier against extrusion of the expanding core mass is provided while nevertheless affording efficient displaced air escape through the vents at the corners of the assembly. In the completed assembly, the collapsed tube 20 functions substantially the same as the members 19 on and about the edge of the closed cell expanded panel core.

In another form of air passage member as shown in FIGURE 6, a preformed strip 25 which may comprise a hollow extrusion or may, as shown, comprise an open cell sponge rubber, whether natural or synthetic, extrusion comprising a longitudinal body with longitudinal radiating ribs which at their edges engage the inner wall surfaces of the edging strips 13 and flanges 14 defining inner wall areas at the molding cavity. In addition to the air escape passages through the porous body and flanges of the member 15, longitudinal air passages 27 defined between the radiating ribs and the cavity walls communicate with the vents along the air escape routes thereto. After compression and collapse of the member 25 on completion of the core expansion, the collapsed member functions in association with the edge of the core similarly as described for the member 19.

It will be understood that variations and modifications may be effected without departing from the spirit and scope of the novel concepts of this invention.

I claim as my invention:

1. A method of molding within a closed cavity comprising:

placing a collapsible member having air passages along a wall within the cavity and thereby providing an air escape route to a vent; placing in the cavity a foamable polyurethane mass; allowing said mass to foam and thereby displacing the air from the cavity by way of said collapsible member;

and moving said polyurethane mass into engagement with said collapsible member.

2. A method as defined in claim 1, in which said collapsible member is porous, and displacing the air through the porous member.

3. A method as defined in claim 1, including adhering the polyurethane mass to the walls defining the cavity and to said collapsible member.

4. A method as defined in claim 3, wherein the cavity comprises a shell defining a panel structure including facing sheets and edging strips secured to the margins of the facing sheets, with vents at the corners defined by the edging strips, placing of the collapsible air passage member comprising lining said strips within the cavity and across said vents to preclude extrusion of the foaming polyurethane mass through the vents.

References Cited

UNITED STATES PATENTS

| | | |
|---|---|---|
| 2,690,987 | 10/1954 | Jeffries et al. |
| 3,111,365 | 11/1963 | Hood et al. |
| 3,161,911 | 12/1964 | Mathews _____ 264—45 |
| 3,291,873 | 12/1966 | Eakin. |

FOREIGN PATENTS

| | | |
|---|---|---|
| 1,476,419 | 4/1966 | France. |

JULIUS FROME, Primary Examiner

L. GARRETT, Assistant Examiner